(12) United States Patent
Ye

(10) Patent No.: US 8,411,430 B2
(45) Date of Patent: Apr. 2, 2013

(54) EMI SHIELDING DEVICE AND FIXING APPARATUS FOR HARD DISK DRIVE HAVING SAME

(75) Inventor: Zhen-Xing Ye, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 304 days.

(21) Appl. No.: 13/011,825

(22) Filed: Jan. 21, 2011

(65) Prior Publication Data
US 2012/0162896 A1   Jun. 28, 2012

(30) Foreign Application Priority Data

Dec. 27, 2010   (CN) .......................... 2010 1 0606915

(51) Int. Cl.
*G06F 1/16* (2006.01)
*H05K 5/00* (2006.01)
*H05K 7/00* (2006.01)

(52) U.S. Cl. .............................. 361/679.33; 361/679.39
(58) Field of Classification Search . 361/679.33–679.39
See application file for complete search history.

(56) References Cited

U.S. PATENT DOCUMENTS

| | | | | |
|---|---|---|---|---|
| 6,325,353 B1* | 12/2001 | Jiang | .............................. | 248/682 |
| 6,661,651 B1* | 12/2003 | Tanzer et al. | ............. | 361/679.33 |
| 6,876,547 B2* | 4/2005 | McAlister | ................ | 361/679.33 |
| 7,511,953 B2* | 3/2009 | Tao et al. | ................. | 361/679.39 |
| 7,626,810 B1* | 12/2009 | Kim et al. | ................ | 361/679.33 |
| 8,270,162 B2* | 9/2012 | Peng et al. | .................... | 361/693 |
| 2011/0304960 A1* | 12/2011 | Lu | ............................ | 361/679.01 |

* cited by examiner

*Primary Examiner* — Adrian S Wilson
(74) *Attorney, Agent, or Firm* — Altis Law Group, Inc.

(57) ABSTRACT

An electromagnetic interference shielding device includes a frame, two first shielding members, and two second shielding members. The first shielding members respectively extend forwards from top and bottom sides of the frame. Each first shielding member includes an elongated first plate, and a number of longitudinally spaced first engaging portions protruding from an outer side of the first plate. The second shielding members are slidably and respectively coupled to front sides of the first shielding members. Each second shielding member includes an elongated second plate, and a number of longitudinally spaced second engaging portions protruding from an outer side of the second plate. The second shielding members are slid relative to the corresponding first shielding members, to allow the second engaging portions of the second shielding members to respectively align with or stagger from the first engaging portions of the corresponding first shielding members.

10 Claims, 6 Drawing Sheets

EMI SHIELDING DEVICE AND FIXING APPARATUS FOR HARD DISK DRIVE HAVING SAME

BACKGROUND

1. Technical Field

The present disclosure relates to an electromagnetic interference (EMI) shielding device, and a fixing apparatus for a hard disk drive having the EMI shielding device.

2. Description of Related Art

According to different transmission frequencies of different hard disk drives, different EMI shielding devices are selectively mounted to a fixing apparatus to meet the EMI shielding needs of the hard disk drives. However, manufacturing so many different types of EMI shielding devices is wasteful, and replacing the EMI shielding devices is troublesome.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
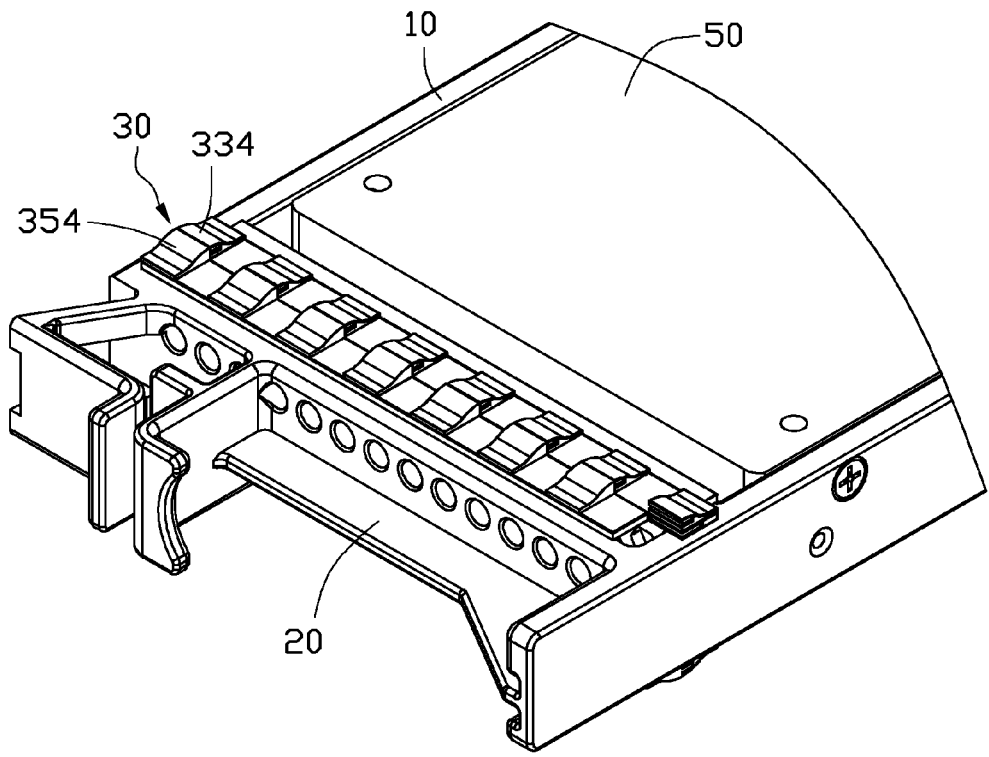
FIG. 1 is a partial, assembled, isometric view of an embodiment of a fixing apparatus together with a hard disk drive, the fixing apparatus including an electromagnetic interference (EMI) shielding device.
Figure 2:
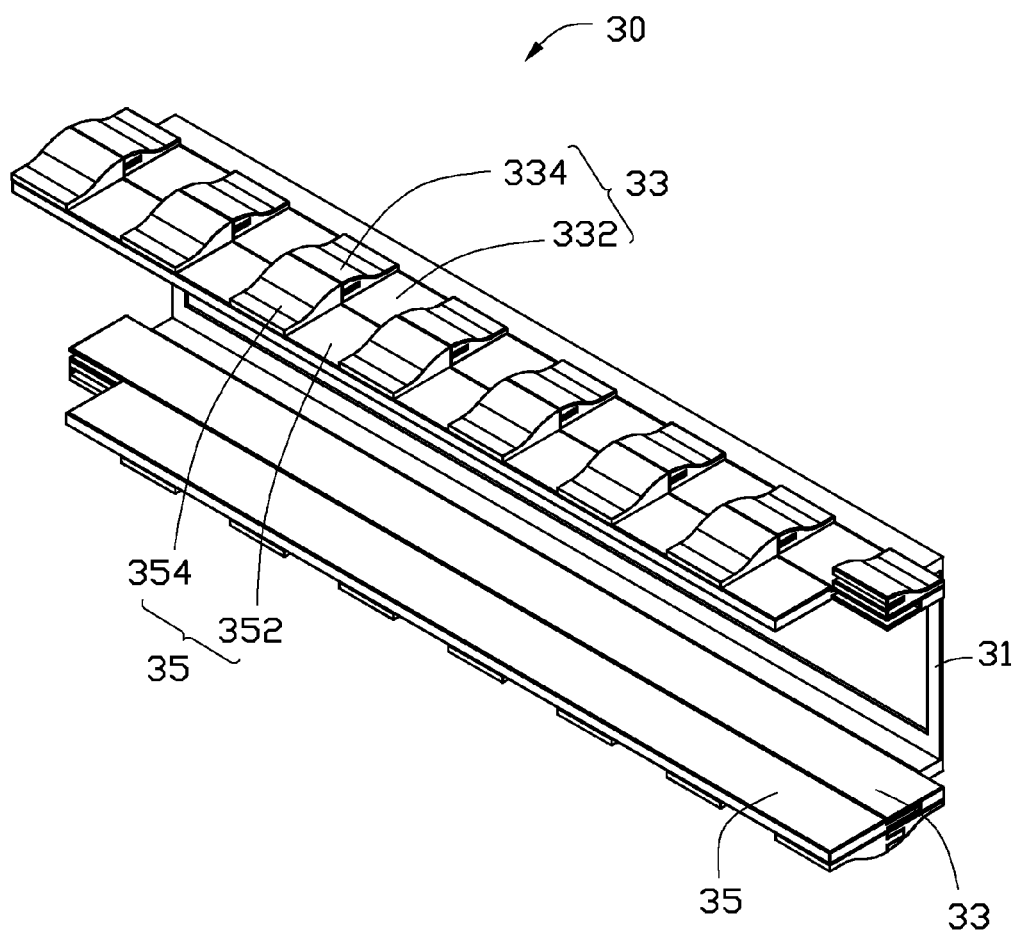
FIG. 2 is an enlarged, isometric view of the EMI shielding device of FIG. 1.
Figure 3:
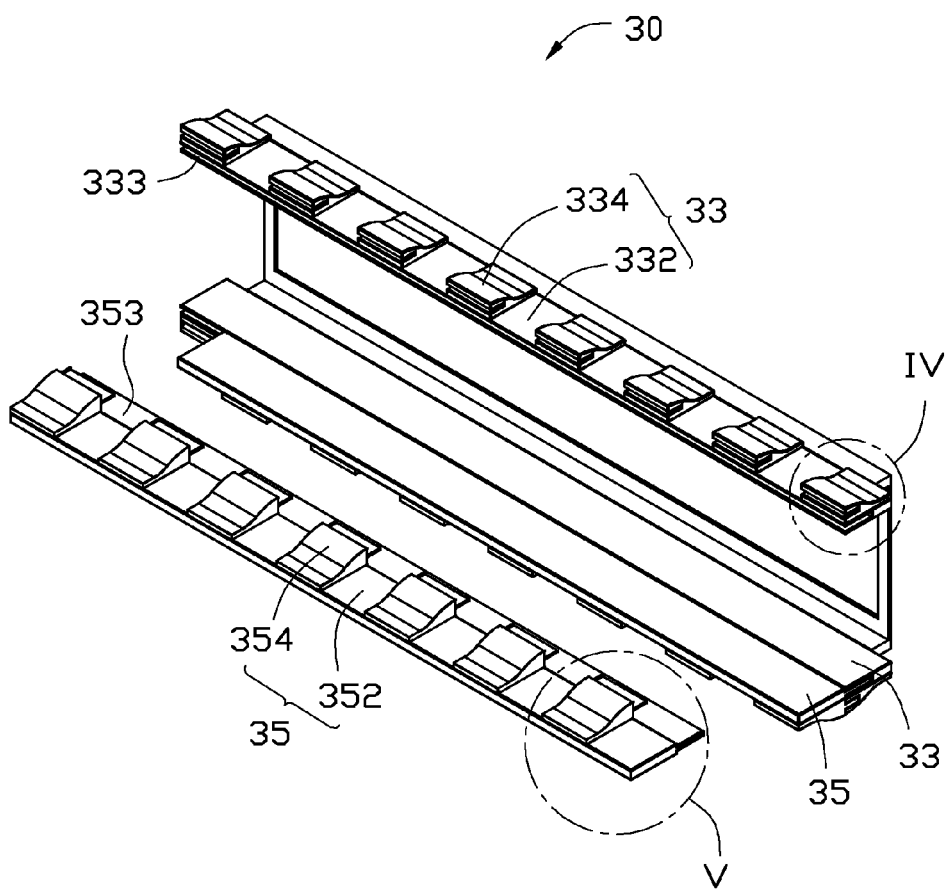
FIG. 3 is an exploded, isometric view of FIG. 2.
Figure 4:
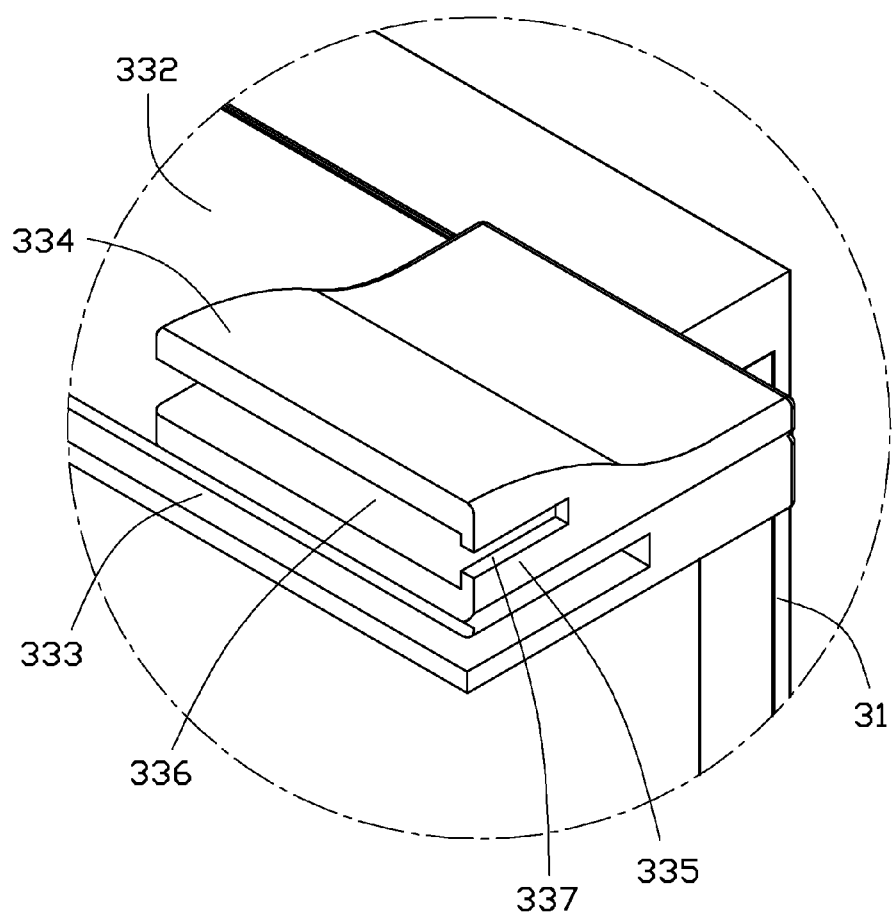
FIG. 4 is an enlarged view of a circled portion IV of FIG. 3.
Figure 5:
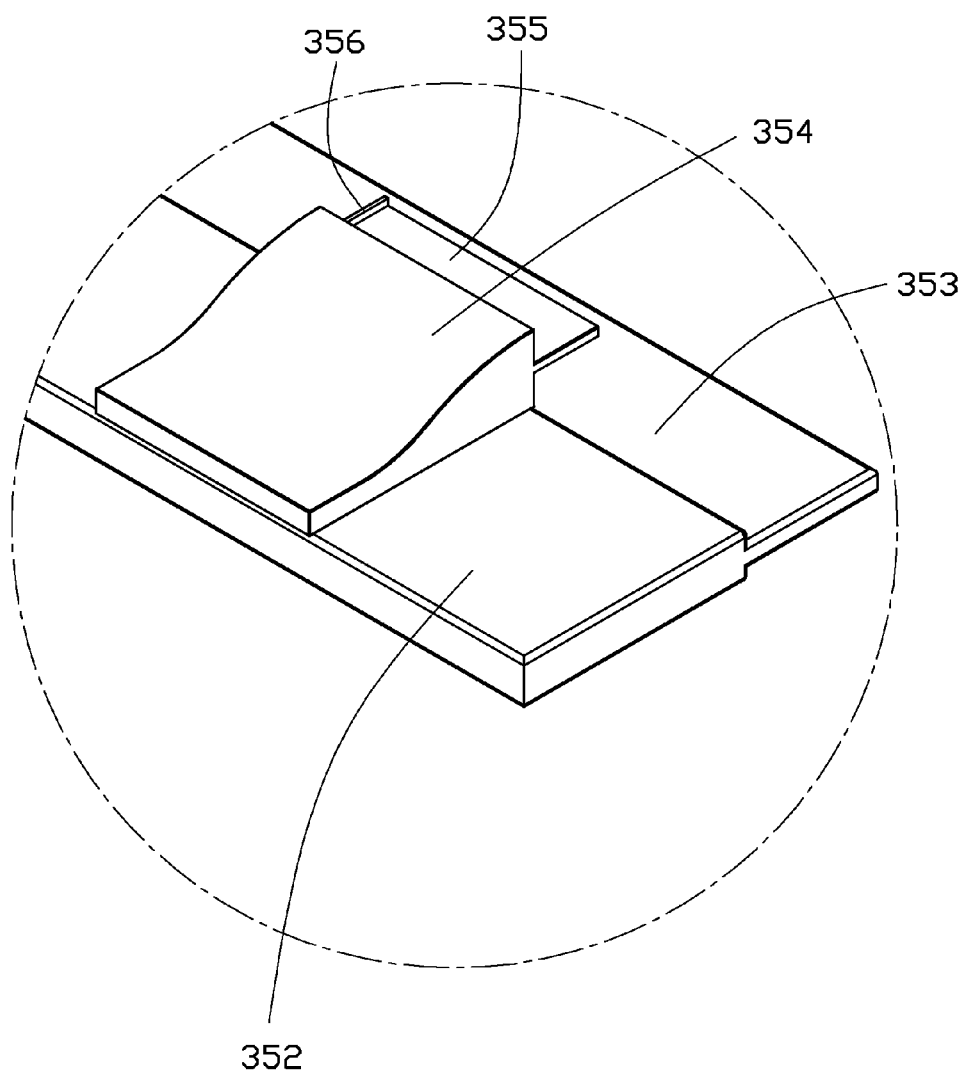
FIG. 5 is an enlarged view of a circled portion V of FIG. 3.

Referring to FIG. 1, an embodiment of a fixing apparatus includes two fixing arms 10, a panel 20 connected between front ends of the fixing arms 10, and an electromagnetic interference (EMI) shielding device 30.

Referring to FIGS. 2 to 5, the EMI shielding device 30 includes a frame 31 defining an opening (not labeled) therein, two first shielding members 33 respectively extending forwards from top and bottom sides of the frame 31, and two second shielding members 35. Each first shielding member 33 includes an elongated plate 332 extending from the corresponding side of the frame 31, and a plurality of resilient longitudinally spaced first engaging portions 334 protruding from an outer side of the plate 332 opposite to the plate 332 of the other first shielding member 33. A slide slot 333 extending longitudinally along the plate 332 is defined in a front side of the plate 332 opposite to the frame 31. A front section of each first engaging portion 334 protrudes out more than a rear section of each first engaging portion 334. Each first engaging portion 334 includes two opposite end walls 335. An opening 336 is defined in a front side of each first engaging portion 334, with an end of each opening 336 extending through one of the end walls 335 of the corresponding first engaging portion 334. A slot 337 is defined in the other end wall 335 of each first engaging portion 334, in communication with the opening 336 of the first engaging portion 334. Each second shielding member 35 includes an elongated plate 352, and a plurality of resilient longitudinally spaced second engaging portions 354 protruding from an outer side of the plate 352. A guiding plate 353 extends longitudinally along the plate 352 from a rear side of the plate 352. A rear section of each second engaging portion 354 protrudes out more than a front section of each second engaging portion 354. In other embodiments, the rear section of each second engaging portion 354 may be spaced from the plate 352. A tab 355 in parallel with the plate 352 protrudes from a rear side of each second engaging portion 354. A stop plate 356 extends up from an end of each tab 355, and a stop plate 356 extends down from the end of the tab 355.

Referring to FIG. 1 again, to assemble the EMI shielding device 30, the frame 31 is fixed to a rear side of the panel 20, with the first shielding members 33 respectively arranged on top and bottom sides of the panel 20. The guiding plates 353 of the second shielding members 35 are respectively inserted into the slide slots 333 of the first shielding members 33. The plates 352 of the second shielding members 35 are slidably connected to the corresponding top and bottom sides of the panel 20 through connecting devices (not shown), to allow the guiding plates 353 to respectively slide in the slide slots 333.

When a hard disk drive 50 having a low transmission frequency is mounted between the fixing arms 10, due to less EMI being produced by the hard disk drive 50, the second shielding members 35 are slid to allow the tabs 355 of the second engaging portions 354 of each second shielding member 35 to engage in the openings 336 of the corresponding first engaging portions 334 of the corresponding first shielding member 33. The second engaging portions 354 of each second shielding member 35 respectively align with the first engaging portions 334 of the corresponding first shielding member 33. The hard disk drive 50 and the fixing apparatus are installed into an electronic product, the first engaging portions 334 and the second engaging portions 354 of the fixing apparatus abut against adjacent metal panels of the electronic product, and shield EMI produced by the hard disk drive 50. At this time, a gap between every two adjacent first engaging portions 334 communicates with a gap between two corresponding second engaging portions 354, which favors heat dissipation.

Figure 6:
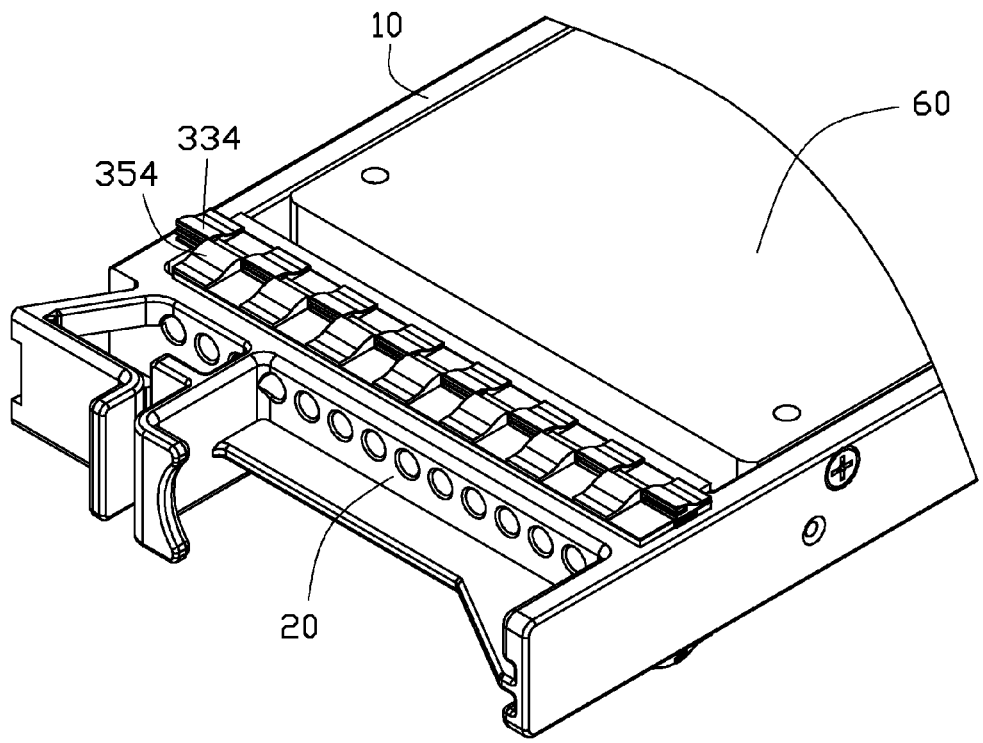
FIG. 6 is an assembled, isometric view of the fixing apparatus of FIG. 1 together with another hard disk drive.

Referring to FIG. 6, when a hard disk drive 60 having a high transmission frequency is mounted between the fixing arms 10, due to more EMI being produced by the hard disk drive 60, the second shielding members 35 are slid to allow the tabs 355 of the second engaging portions 354 of each second shielding member 35 to disengage from the openings 336 of the corresponding first engaging portions 334 of the corresponding first shielding member 33 through the corresponding slots 337, until the stop plate 356 of the tab 355 of each second engaging portion 354 abuts against an inner surface of the end wall 335 adjoining the slot 337 of the corresponding first engaging portion 334. At this time, the second engaging portions 354 of each second shielding member 35 respectively stagger from the first engaging portions 334 of the corresponding first shielding member 33, and the gap between every two adjacent first engaging portions 334 is blocked by a corresponding second engaging portion 354. The hard disk drive 60 and the fixing apparatus are installed into an electronic product, the first engaging portions 334 and the second engaging portions 354 of the fixing apparatus abut against adjacent metal panels of the electronic product, and shield EMI produced by the hard disk drive 50.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An electromagnetic interference (EMI) shielding device, comprising:
   a frame;
   two first shielding members respectively extending forwards from top and bottom sides of the frame, each of the first shielding members comprising an elongated first plate, and a plurality of longitudinally spaced first engaging portions protruding from an outer side of the first plate opposite to the first plate of the other first shielding member; and
   two second shielding members slidably and respectively coupled to front sides of the first shielding members, each of the second shielding members comprising an elongated second plate, and a plurality of longitudinally spaced second engaging portions protruding from an outer side of the second plate, the second shielding members to slide relative to the corresponding first shielding members, to allow the second engaging portions of the second shielding members to respectively align with or stagger from the first engaging portions of the corresponding first shielding members.

2. The EMI shielding device of claim 1, wherein a slide slot extending longitudinally along the first plate of each of the first shielding members is defined in a front side of the first plate, and a guiding plate extends longitudinally along the second plate of each of the second shielding members from a rear side of the second plate, the guiding plates of the second shielding members are slidably received in the slide slots of the corresponding first shielding members.

3. The EMI shielding device of claim 1, wherein a front section of each of the first engaging portions protrudes out more than a rear section of each of the first engaging portions, and a rear section of each of the second engaging portions protrudes out more than a front section of each of the second engaging portions.

4. The EMI shielding device of claim 1, wherein each of the first engaging portions comprises two opposite end walls, an opening is defined in a front side of each of the first engaging portions with an end of the opening extending through one of the end walls of the first engaging portion, a slot communicating with the opening is defined in the other end wall of the first engaging portion, a tab protrudes from a rear side of each of the second engaging portions, and a stop plate extends from an end of each tab, when the second engaging portions of the second shielding members respectively align with the first engaging portions of the first shielding members, the tabs of the second engaging portions are respectively received in the openings of the corresponding first engaging portions; when the second engaging portions of the second shielding members respectively stagger from the first engaging portions of the first shielding members, the tabs of the second engaging portions are disengaged from the openings of the corresponding first engaging portions through the slots, and the stop plate of each tab abuts against an inner surface of the end wall adjoining the slot of the corresponding first engaging portion.

5. The EMI shielding device of claim 1, wherein each of the first and second engaging portions is resilient.

6. A fixing apparatus for a hard disk drive, the fixing apparatus comprising:
   two fixing arms for sandwiching the hard disk drive;
   a panel connected between front ends of the fixing arms; and
   an electromagnetic interference (EMI) shielding device comprising two first shielding members respectively arranged on top and bottom sides of the panel, and two second shielding members slidably and respectively coupled to the first shielding members, each of the first shielding members comprising an elongated first plate, and a plurality of longitudinally spaced first engaging portions protruding from an outer side of the first plate, each of the second shielding members comprising an elongated second plate, and a plurality of longitudinally spaced second engaging portions protruding from an outer side of the second plate, the second shielding members to slide relative to the corresponding first shielding members, the second engaging portions of the second shielding members respectively aligning with or staggered from the first engaging portions of the first shielding members.

7. The fixing apparatus of claim 6, wherein the EMI shielding device further comprises a frame connected between rear sides of the first shielding members, the frame is mounted to a rear side of the panel.

8. The fixing apparatus of claim 6, wherein a slide slot extending longitudinally along the first plate of each of the first shielding members is defined in a front side of the first plate, and a guiding plate extends longitudinally along the second plate of each of the second shielding members from a rear side of the second plate, the guiding plates of the second shielding members are slidably received in the slide slots of the corresponding first shielding members.

9. The fixing apparatus of claim 6, wherein each of the first and second engaging portions is resilient, a front section of each of the first engaging portions protrudes out more than a rear section of each of the first engaging portions, and a rear section of each of the second engaging portions protrudes out more than a front section of each of the second engaging portions.

10. The fixing apparatus of claim 6, wherein each of the first engaging portions comprises two opposite end walls, an opening is defined in a front side of each of the first engaging portions with an end of the opening extending through one of the end walls of the first engaging portion, a slot communicating with the opening is defined in the other end wall of the first engaging portion, a tab protrudes from a rear side of each of the second engaging portions, and a stop plate extends from an end of each tab, when the second engaging portions of the second shielding members respectively align with the first engaging portions of the first shielding members, the tabs of the second engaging portions are respectively received in the openings of the corresponding first engaging portions; when the second engaging portions of the second shielding members respectively stagger from the first engaging portions of the first shielding members, the tabs of the second engaging portions are disengaged from the openings of the corresponding first engaging portions through the slots, and the stop plate of each tab abuts against an inner surface of the end wall adjoining the slot of the corresponding first engaging portion.

* * * * *